Oct. 6, 1970  E. G. SUKUP  3,532,232
APPARATUS FOR EVENLY EVACUATING GRAIN FROM A GRAIN DRYING BIN
Filed Dec. 9, 1968  2 Sheets-Sheet 1

INVENTOR
EUGENE G. SUKUP
BY
Henderson & Strom
ATTORNEYS

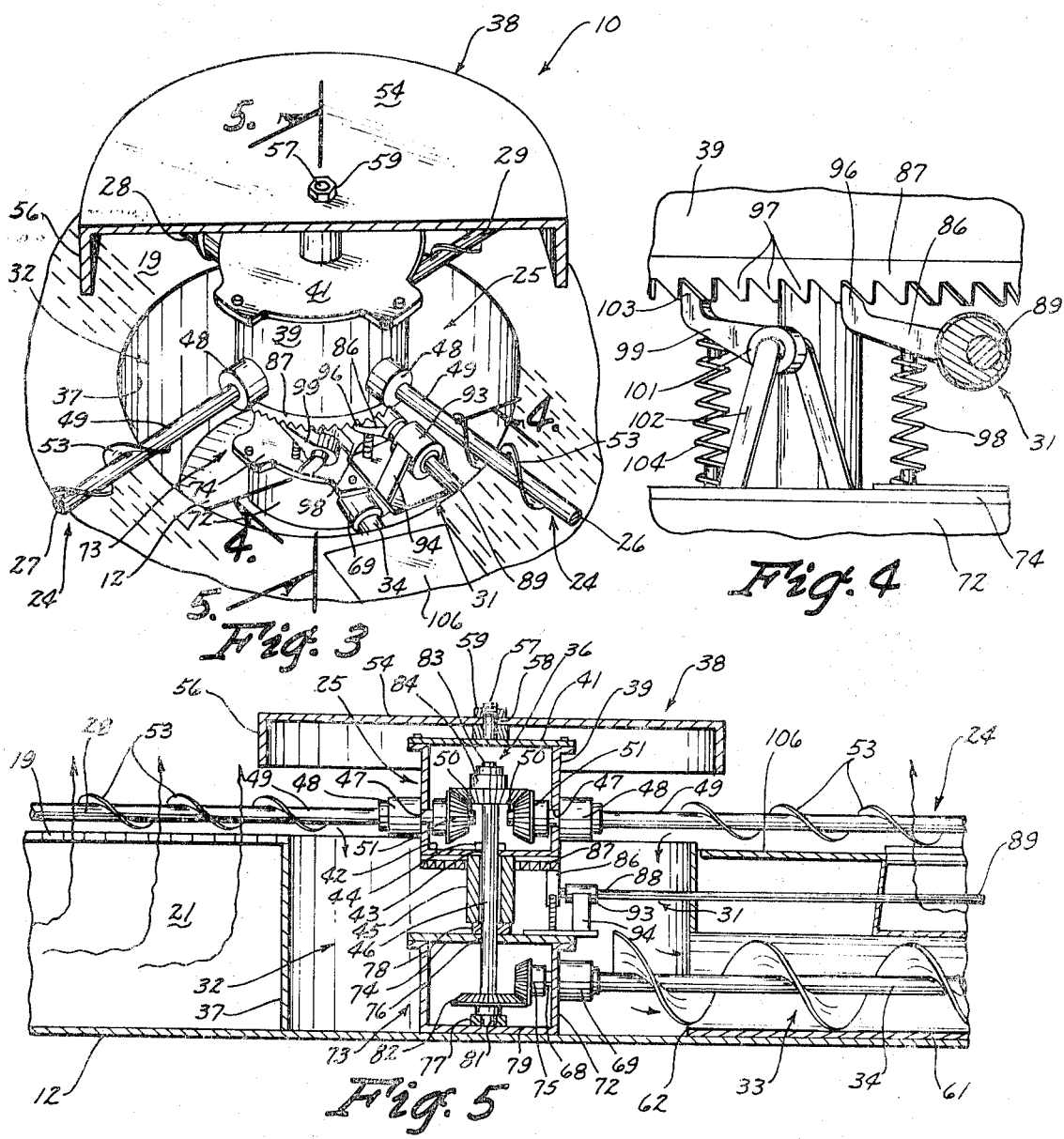

United States Patent Office 3,532,232
Patented Oct. 6, 1970

3,532,232
APPARATUS FOR EVENLY EVACUATING GRAIN FROM A GRAIN DRYING BIN
Eugene G. Sukup, Sheffield, Iowa 50475
Filed Dec. 9, 1968, Ser. No. 782,266
Int. Cl. B65g 65/46
U.S. Cl. 214—17                    2 Claims

ABSTRACT OF THE DISCLOSURE

This invention relates to an apparatus for removing grain from a grain drying bin and specifically to an apparatus that will remove the grain from the floor of the bin such that the level of the grain will feed evenly downward throughout the bin, the apparatus including a plurality of sweep augers radially extending from a rotatable housing disposed within a pit formed below the floor of the bin, the sweep augers rotating about the axis of the bin while simultaneously rotating about their own axes for engaging and feeding the grain on the floor into the pit, the pit having an outlet tube under the floor communicating with the exterior of the bin, and a rotatable discharge auger axially mounted within the tube, the discharge auger engaging the grain in the pit and transferring the grain through the tube to the exterior of the bin, and a drive unit interconnecting the discharge auger and the sweep augers to rotate the sweep augers about their own axes upon rotation to the discharge auger.

BACKGROUND OF THE INVENTION

This invention relates to an apparatus for removing grain from a grain drying bin and particularly to an apparatus that will reduce the level of grain evenly downward throughout the bin to increase the efficiency of the drying process.

Two popular forms of drying granular material are the bin layer dryer and the batch-in-bin dryer. The former, equipped with a fan and a heat unit, dries the granular material in layers. Heated air is forced through the granular material thereby absorbing moisture and thus reducing the moisture content in the first layer, a second layer is then added and the drying process recommences. This process of adding layers and forcing air therethrough continues, until the bin is filled. The heated air is forced into the bin under the first layer, therefore it is obvious that the lower levels in the bin are subjected to the drying process several times. The bin layer dryer requires a substantial amount of time to dry a full bin of granular material. The lower levels can not be overheated or overdried because of possible damage to the kernel and loss of profit, therefore requiring the constant attention of an operator to prevent overdrying and overheating.

To overcome the disadvantages of the bin layer dryer, operators are changing to batch-in-bin dryer systems. Herein the granular material is dried in a layer on the perforated floor of the drying bin and then transferred to a storage bin. The speed of drying is increased considerably because higher temperatures are utilized, higher velocities of air are possible, and each layer is dried only once. A disadvantage to this system of drying is that it is necessary to dry a batch and transfer it from the drying bin before adding a second batch and repeating the drying process, which reduces the efficiency of the system by increasing the drying time. This invention combines the advantage of a bin layer dryer and the batch-in-bin dryer while eliminating the disadvantages of each respectively.

SUMMARY OF THE INVENTION

This invention relates to an apparatus for removing grain from a grain drying bin, wherein the level of the drying grain is fed evenly downward to the perforated floor of the bin for eventual removal therefrom, the apparatus comprising a sweep unit rotatable about the axis of the bin, the sweep unit having a plurality of radially extending augers disposed adjacent the bin floor, and rotatable about their own axes to engage and feed the grain adjacent the perforated floor to a pit centrally formed therein; a discharge tube fluidly communicating the pit with the exterior of the bin, and a discharge auger axially mounted therein to remove the grain from the pit; and a drive unit interconnecting the sweep augers and the discharge auger to rotate the sweep augers about their own axes in response to rotation of the discharge auger.

It is an object of this invention to provide a novel apparatus for removing grain from a grain drying bin.

It is another object of this invention to provide an apparatus for removing dried grain from a drying bin while simultaneously dropping the level of drying grain evenly toward the perforated floor.

It is yet another object of this invention to provide a continuous grain dryer wherein grain to be dried can be piled on top of drying grain, while grain already dried may be simultaneously evacuated from the drying bin.

It is still another object of this invention to provide an apparatus that will remove dried grain from a drying bin to prevent it from overdrying while permitting grain not yet dried to remain in the bin for further drying.

It is a further object of this invention to provide an apparatus which will remove dried grain from a drying bin for transfer to a storage bin with a minimal amount of manual labor.

It is an object of this invention to provide an apparatus to remove dried grain from a grain drying bin which will make the conventional grain drying bin more efficient and more economical to operate.

It is another object of this invention to provide an apparatus for removing grain from a grain drying bin which is adaptable for use with all conventional circular grain drying bins.

It is still another object of this invention to provide a grain removal apparatus for a grain drying bin which is simple, economical, and rugged in construction.

These objects and other features an dadvantages will become readily apparent upon reference to the description when taken in conjunction with the accompanying drawings.

BRIEF DESCRIPTION OF THE DRAWINGS

FIG. 3 is a perspective fragmentary view of the apparatus of this invention;

FIG. 4 is an elevational fragmentary view as taken along the line 4—4 of FIG. 3; and FIG. 5 is a fragmentary vertical view as taken along the line 5—5 of FIG. 3.

DESCRIPTION OF THE PREFERRED EMBODIMENT

Figure 1:
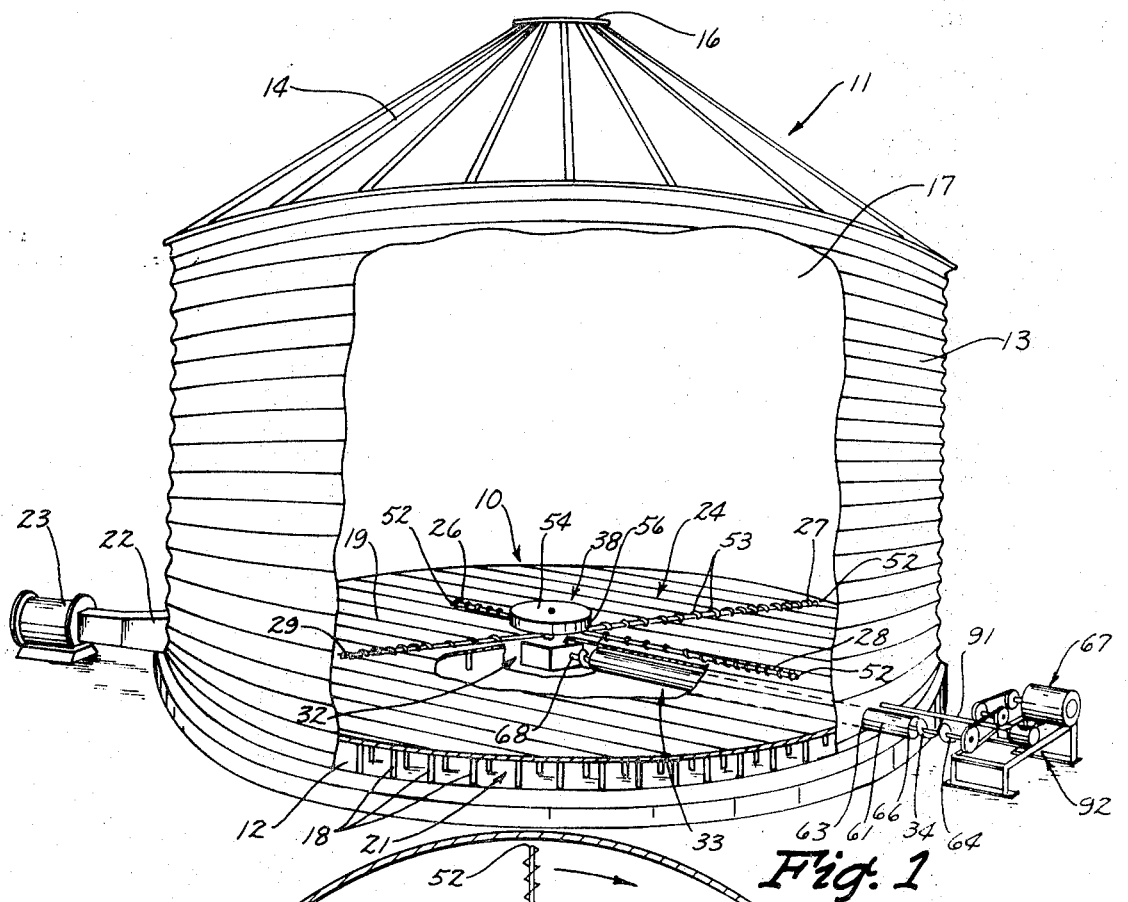
FIG. 1 is a perspective view showing the grain evacuating apparatus of this invention in conjunction with a conventional grain drying bin, with certain parts broken away for clarity of illustration.

Referring now to the drawings and particularly to FIG.

1, the grain removing apparatus of this invention is indicated generally by the numeral 10 and is shown in working relationship with a conventional grain drying bin 11.

The grain drying bin 11 generally includes a foundation or slab 12 supporting an upstanding circular wall 13 having a conically shaped roof 14 mounted thereon. An opening 16 is formed in the apex of the roof 14 for communicating the interior 17 of the bin 11 with the exterior. Suspended above the slab 12 by a plurality of supports 18 is a perforated floor 19 which supports the grain. The substantially open chamber 21 formed between the floor 19 and the slab 12 distributes heated dry air forced into the chamber 21 through a vent 22 connected to a blower-furnace 23 under the entire floor 19. The forced air then percolates upward through the floor 19 and grain supported thereon, absorbing the moisture in the grain, and exits the bin 11 through the opening 16 provided in the roof 14.

The grain removing apparatus 10 (FIGS. 1 and 3) of this invention generally comprises a sweep unit 24 having a housing member 25 interconnecting a plurality of augers 26–29 radially extending therefrom; a rotating device 31 operably engaging the housing member 25 to rotate the sweep unit 24 about the axis of the bin 11, the sweep augers 26–29 operable to feed grain (not shown) inwardly the bin 11; and a discharge unit 33 fluidly connecting the pit 32 with the exterior of the bin 11, the discharge unit including a discharge auger 34 for engaging and evacuating the grain in the pit 32 to the exterior of the bin 11. The sweep augers 26–29 and discharge auger 34 are interconnected by a drive unit 36 (FIG. 5) operable to rotate the sweep augers 26–29 about their own axes in response to rotation of the discharge auger 34.

The pit 32 (FIGS. 1, 3 and 5) is a cavity formed centrally in the perforated floor 19 communicating with the interior 17 of the bin 11. The pit 32 is formed by an enclosed wall 37 interconnecting the perforated floor 19 and the slab 12 of the bin 11.

The sweep unit 24 (FIGS. 1, 3, and 5) generally includes a plurality of radially extending augers 26–29 connected to a housing member 25, and a cap 38 overlapping the periphery of the pit 32. The cap 38 is connected to the housing member 25 above the augers 26–29. The housing member 25 (FIGS. 3 and 5) is a drum-like enclosure having a circular wall 39 connected to a top 41 and a bottom plate 42.

The bottom plate 42 (FIG. 5) has an aperture 43 formed in the center thereof, the aperture 43 being axially aligned with a bearing 44 and tubular sleeve 45 attached to the bottom plate 42. A drive shaft 46, having an axis identical to the axis of the bin 11, is journaled through the sleeve 45, aperture 43, and bearing 44 to rotatably mount the housing member 25 in the pit 32. The drive shaft 46 will be more fully described hereinafter.

To rotatably connect the sweep augers 26–29 (FIGS. 3 and 5) to the housing member 25, a plurality of annularly spaced holes 47 are formed in the housing wall 39. A plurality of bearing 48 are axially aligned with the holes 47 and are attached to the housing wall 39. The shafts 49 of the augers 26–29 are journaled through the bearings 48 and holes 47 to connect, inside the housing member 25, a plurality of beveled gears 51 for rotating the augers 26–29 about their own axes, as hereinafter described.

The augers 26–29, connected only at their proximal end 50 (FIG. 5) to the housing wall 39, are disposed above the perforated floor 19 and extend substantially parallel thereto, to engage and feed grain adjacent the floor 19 inwardly to the central pit 32. As the augers 26–29 rotate about their own axes to move the grain radially inward, the augers 26–29 intermittently rotate about the longitudinal axis of the bin 11, as hereinafter described.

A characteristic of an auger is that it will first engage and move grain at its distal or free end 52 (FIGS. 1 and 2) to the exclusion of grain positioned along its length. This characteristic is because the distal end 52 acts as a screw to fill the area between the flightings 53 and as this engaged material moves along the length of the auger, there is not any space between the flightings 53 for additional material.

The augers 26–29 (FIGS. 1 and 2) are of a varied length to compensate for the auger characteristic, so as to engage substantially all the grain adjacent the perforated floor 19 upon each revolution of the augers 26–29 about the axis of the bin 11, and to reduce the level of the grain supported by the floor 19 in a substantially even manner. For bins 11 having a large diameter, it is preferred that the pitch of the auger flighting 53 be increased from a narrow pitch at the outer end 52 to a relatively broad pitch along its length in order to engage additional grain along the length of the augers 26–29. By broadening the pitch of the flighting 53, the grain positioned on the floor 19, away from the annular path followed by the distal ends 52 of the augers 26–29, will be engaged and moved to the pit 32 by the augers 26–29 and the level reduction of the grain will be enhanced.

To prevent the grain piled on the perforated floor 19 from gravity feeding directly into the pit 32, a cap 38 (FIGS. 3 and 5) overlapping the periphery of the pit 32 is provided. The cap 38 includes a flat plate 54 having a downwardly flanged edge 56. The cap 38 is connected to the top plate 41 of the housing 25 by a bolt 57 attached to the center of the top plate 41. The bolt 57 extends through a hole 58 formed in the cap plate 54 and is secured by a nut 59.

The discharge unit 33 (FIGS. 1, 2 and 5) generally comprises a cylindrical tube 61 fluidly connecting the pit 32 to the exterior of the bin 11, and a discharge auger 34 axially mounted therein. The tube 61 attaches to the wall 37 of the pit 32 and is fluidly communicable therewith by a hole 62 formed in the wall 37 adjacent the lower extremity of the pit 32. The tube 61 extends from the pit 32 through a hole 63 (FIG. 1) formed in the bin wall 13 below the perforated floor 19, to empty into a hopper (not shown) or the like for transfer to a storage area.

The discharge auger 34 (FIGS. 1 and 2) extends through the tube 61 to engage the grain in the pit 32 and feed the grain through the tube 61 to the exterior of the pit 32. The outer end 64 of the discharge auger 34 extends beyond the outer end 66 of the tube 61 and is connected to a power source 67 for rotating the discharge auger 34 and the sweep augers 26–29 as hereinafter described.

The inner end 68 (FIG. 5) of the discharge auger 34 is journaled through a bearing 69 and hole (not shown) formed in the side 72 of an enclosed base 73 and is secured thereto by a bevel gear 75 connected to the auger end 68 within the base 73.

The enclosed base 73 is anchored to the slab 12 in the center of the pit 32, and includes a cover 74 connected to the sides 72, which cover 74 has a hole 76 centrally formed therein to receive the vertically disposed drive shaft 46. A pair of bearings 77, 78 are axially aligned with the hole 76 and are connected to the bottom 79 and cover 74 of the base 73, respectively.

The drive shaft 46 (FIG. 5) is journaled through the bearings 77, 78 and hole 76 to rotatably connect the sweep unit 24 to the base 73 as hereinbefore described. The lower end 81 of the drive shaft 46 is connected to a bevel gear 82, which gear 82 meshes with the bevel gear 75 attached to the discharge auger 34. The upper end 83 of the drive shaft 46 is disposed within the sweep housing 25, and is connected to another bevel gear 84, which gear 84 meshes with each of the beveled gears 51 connected to the sweep augers 26–29, whereby rotation of the discharge auger 34 by the power source 67, rotates the drive shaft 46, which simultaneously rotates the sweep augers 26–29 about their own axes.

The sweep unit 24 is rotated about the axis of the bin 11 by a rotating device 31. The rotating device 31 (FIGS. 3–5) has a cam member 86 engaging a ratchet wheel 87 attached to the bottom plate 42 of the housing member 25. The cam member 86 is connected to one end 88 of a rod 89, which rod 89 is extended through the pit wall 37 and the bin wall 13, and connected at the other end 91 (FIGS. 1 and 2) to a second power source 92 to rotate the rod 89. The inner end 88 (FIGS. 3 and 5) of the rod 89 is supported by bearing 93 attached to a bracket 94 connected to the base 73.

The cam member 86 (FIG. 4) is offset on the rotating rod 89 such that the distal end 96 of the cam member 86 engages each successive tooth 97 of the ratchet wheel 87 upon each revolution of the rod 89. As the rod 89 rotates about its axis, the cam rod 96 contacts a tooth 97 of the ratchet wheel 87 upon each revolution, whereby the sweep unit 24 is intermittently rotated the distance of the ratchet wheel tooth 97 with each complete revolution of the rod 89. To maintain the cam member 86 in constant engagement with the ratchet wheel 87, a coil spring 98 interconnects the cam member 86 to the bracket 94.

To prevent the sweep unit 24 (FIGS. 3 and 4) from movement during the interval that the cam member 86 is moving to engage the next ratchet wheel tooth 97, a pawl 99 is provided. The pawl 99 is pivotally connected at one end 101 to a support 102 attached to the base cover 74. The other end 103 of the pawl 99 engages the ratchet wheel 87 and remains in constant engagement therewith by a second coil spring 104 interconnecting the pawl 99 and the cover 74 of the base 73.

In operation, a batch of grain is emptied into the bin 11 (FIG. 1) through the hole 16 in the roof 14 and heated, dry air is percolated through the floor 19 and grain (see arrows, FIG. 5). Subsequently, additional batches of grain are emptied into the bin 11 on top of each successive batch, whereby each batch is in a different stage of the drying process with the batch closest the perforated floor 19 containing the least moisture content because of its proximity to the incoming heated, dry air and the longer duration of time it has been subjected to the drying process.

When the moisture content of the lowest batch of grain reaches the desired level, the power source 67 is activated to rotate the discharge auger 34 and simultaneously rotate the drive shaft 46 and sweep augers 26–29 about their own axes. The rotation of the sweep augers 26–29 cause the grain adjacent the perforated floor 19 to move radially inwardly and empty into the pit 32 (see arrows, FIG. 5). The collected grain in the pit 32 is then moved to the exterior of the bin 11 through the tube 61 by the discharge auger 34.

Once the sweep augers 26–29 are rotating about their own axes, the power source 92 is activated to rotate the rod 89 connected to the cam member 86 to commence rotation of the sweep augers 26–29 about the axis of the bin 11. As the augers 26–29 rotate about the axis of the bin 11 adjacent the perforated floor 19, grain is engaged at the staggered ends 52 thereof, or along the length of the augers 26–29 if the augers are of a varied pitch, and moved inwardly to empty into the pit 32. The varying lengths and flighting pitch of the augers 26–29 enables all of the grain adjacent the perforated floor 19 to be swept into the pit 32 upon each revolution of the sweep unit 24, and the next level of grain to drop to the perforated floor 19 for final drying.

Figure 2:
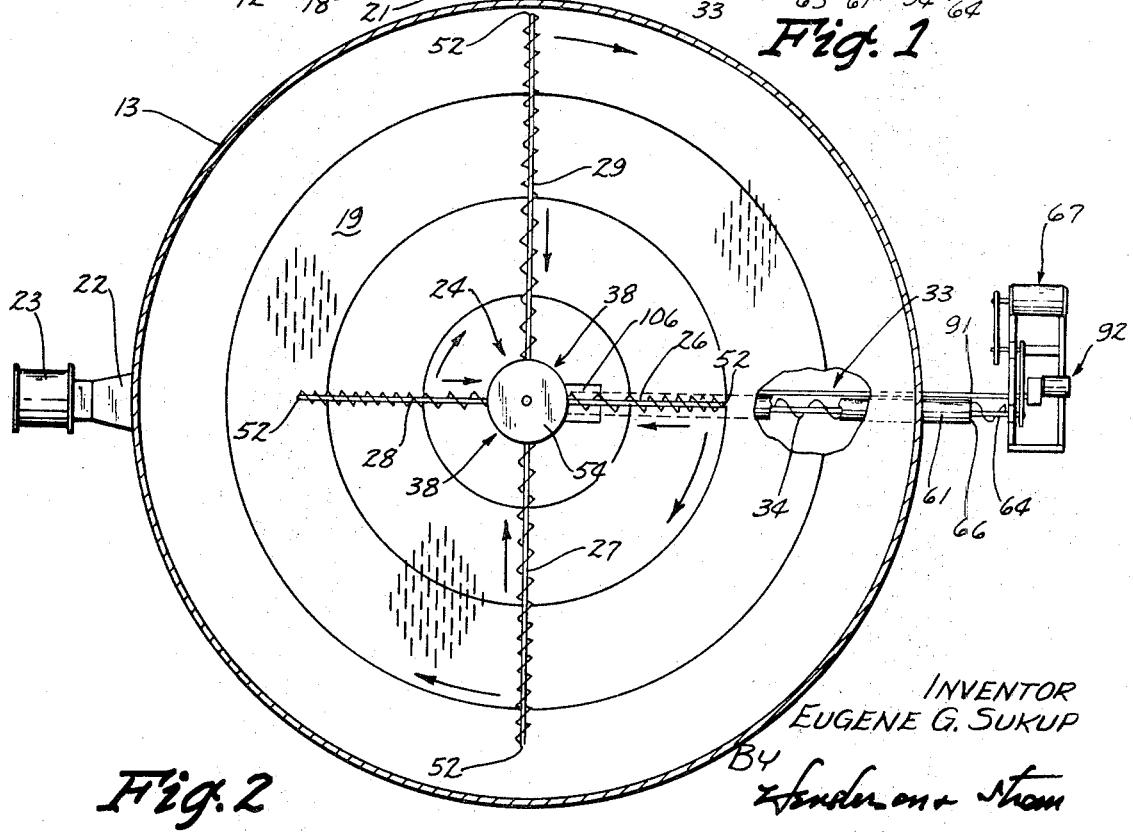
FIG. 2 is a plan view of the grain evacuating apparatus and drying bin with certain parts broken away for clarity of illustration.

To facilitate completely emptying the bin 11, the floor 19 of the bin 11 is provided with a door 106 (FIGS. 2 and 5). The door 106 is slidably mounted in the floor 19 and separates the interior 17 (FIG. 1) of the bin 11 from the discharge tube 61. When the grain in the bin 11 reaches such a low level that the augers 26–29 will no longer move the grain to the pit 32, the door 106 is slid open to permit manual sweeping of the grain into the discharge tube 61 for final removal from the bin 11.

Although a preferred embodiment of an apparatus for evenly evacuating grain from a grain drying bin has hereinbefore been described, it is to be remembered that various alterations and modifications can be made thereto without departing from the invention.

I claim:

1. An apparatus for evacuating grain from a grain drying bin having a perforated floor supported above a slab, said apparatus comprising:

a pit formed centrally in the perforated floor of the bin, which pit includes an enclosed wall interconnecting the slab and the floor, said pit being open to receive grain from the floor of the bin;

sweep means rotatable about the axis of the bin for feeding grain into said pit, said sweep means including a plurality of augers the outer ends of which are free, and which augers extend parallel to and above the perforated floor and radially from said pit, said augers rotatable about their own axes and each of a selective length to evenly feed grain from the bin to said pit, said sweep means including a cap extended over said pit and above said sweep augers to prevent grain from verticaly feeding into said pit;

discharge means fluidly communicating said pit and the exterior of the bin for evacuating grain from said pit, said discharge means including an auger rotatable about its own axis;

drive means operably connecting said sweep augers and said discharge auger for rotating said sweep augers about their own axes; and means for operably rotating said sweep means about the axis of the bin.

2. An apparatus for evacuating grain from a grain drying bin as defined in claim 1, wherein said sweep augers include a shaft and flighting, the pitch of said flighting varying from a narrow pitch at the outer end of said augers to a relatively broad pitch along the length of said augers.

References Cited

UNITED STATES PATENTS

| | | | |
|---|---|---|---|
| 1,274,548 | 8/1918 | Holagel et al. | |
| 3,050,201 | 8/1962 | Humphrey | 214—17 |
| 3,076,567 | 2/1963 | O'Dell | 214—17 |
| 3,129,828 | 4/1964 | Lusk | 214—17 |
| 3,229,827 | 1/1966 | Kucera | 214—17 |
| 3,259,538 | 7/1966 | Schnyder | 214—17 |

ROBERT G. SHERIDAN, Primary Examiner